United States Patent [19]
O'Cinneide

[11] Patent Number: 6,138,036
[45] Date of Patent: Oct. 24, 2000

[54] WIRELESS TELEPHONE WITH VOICE DATA INTERFACE MODE

[75] Inventor: Breanndan O'Cinneide, Celbridge, Ireland

[73] Assignee: Oki Telecom, Inc., Suwanee, Ga.

[21] Appl. No.: 08/816,356

[22] Filed: Mar. 13, 1997

[51] Int. Cl.[7] .................................................. H04Q 7/20
[52] U.S. Cl. ........................ 455/557; 455/412; 455/414
[58] Field of Search .................................. 455/403, 412, 455/414, 417, 466, 550, 556, 557, 461; 379/90.02, 201, 210

[56] References Cited

U.S. PATENT DOCUMENTS

| | | | |
|---|---|---|---|
| 4,068,092 | 1/1978 | Ikoma et al. | |
| 4,517,561 | 5/1985 | Burke et al. | 340/825.07 |
| 4,518,827 | 5/1985 | Sagara | 179/81 |
| 4,520,500 | 5/1985 | Mizuno et al. | 381/43 |
| 4,532,378 | 7/1985 | Nakayama et al. | 179/2 DP |
| 4,644,351 | 2/1987 | Zabarsky et al. | 340/825.44 |
| 4,649,563 | 3/1987 | Riskin | 379/97 |
| 4,663,777 | 5/1987 | Szeto | 379/88 |
| 4,701,905 | 10/1987 | Un et al. | 370/18 |
| 4,716,583 | 12/1987 | Groner et al. | 379/88 |
| 4,718,116 | 1/1988 | Jacobs et al. | 455/245 |
| 4,837,800 | 6/1989 | Freeburg et al. | 379/59 |
| 4,965,569 | 10/1990 | Bennett et al. | 340/825.44 |
| 4,991,197 | 2/1991 | Morris | 379/58 |
| 5,023,905 | 6/1991 | Wells et al. | 379/96 |
| 5,054,073 | 10/1991 | Yazu | 381/37 |
| 5,095,503 | 3/1992 | Kowalski | 579/59 |
| 5,128,981 | 7/1992 | Tsukamoto et al. | 379/58 |
| 5,327,486 | 7/1994 | Wolff et al. | 379/210 |
| 5,353,334 | 10/1994 | O'Sullivan | 379/59 |
| 5,418,835 | 5/1995 | Forhman et al. | 455/556 |
| 5,471,470 | 11/1995 | Sharma et al. | 370/81 |
| 5,487,175 | 1/1996 | Bayley et al. | 455/54.2 |
| 5,497,373 | 3/1996 | Hulen et al. | 370/79 |
| 5,499,286 | 3/1996 | Kobayashi | 455/550 |
| 5,590,406 | 12/1996 | Bayley et al. | 455/54.2 |
| 5,604,788 | 2/1997 | Tett | 455/412 |
| 5,647,002 | 7/1997 | Brunson | 379/201 |
| 5,678,196 | 10/1997 | Doyle | 455/54.1 |
| 5,742,905 | 4/1998 | Pepe et al. | 455/461 |
| 5,781,857 | 7/1998 | Hwang et al. | 455/412 |
| 5,819,172 | 10/1998 | Campana, Jr. et al. | 455/412 |
| 5,930,719 | 7/1999 | Babitch et al. | 455/557 |
| 6,006,109 | 12/1999 | Shin | 455/557 |
| 6,029,072 | 2/2000 | Barber | 455/557 |

OTHER PUBLICATIONS

Qualcomm, Richard Kerr; CDMA Digital Cellular, An ASIC Overview.
Business Week; Special Report—'Operator, Get Me Cyberspace'; Jun. 24, 1996.
www. vocaltec.cpm/ ;The VocalTec Home Page.

*Primary Examiner*—Nay Maung
*Attorney, Agent, or Firm*—Thomas, Kayden, Horstemeyer & Risley LLP

[57] ABSTRACT

A wireless telephone is additionally operable in a voice data interface mode in which voice (sound) data is output from the wireless telephone for communication over a data network, such as, for example, the Internet. In the voice data interface mode, voice audio signals detected through a wireless telephone microphone are converted into data for transmission through the data network, and, likewise, voice data received by the wireless telephone from the data network, or sound data simply generated by a connected PC, is converted into audio signals and output through a wireless telephone speaker. In one embodiment, a wireless telephone with voice data interface functionality is serially connected as a peripheral device to a local PC which is also connected to an Internet service provider (ISP) through land lines, and in another embodiment, through the wireless telephone itself. Other embodiments include the wireless telephone connecting to the PC through a wireless link, and in others, connecting directly to an ISP. Storage of compressed digitized audio is also included for when communication of the voice data is not possible.

10 Claims, 5 Drawing Sheets

WIRELESS TELEPHONE WITH VOICE DATA INTERFACE MODE

BACKGROUND OF THE INVENTION

The present invention relates generally to the field of telecommunications, and more specifically, to the field of wireless telephone interface systems.

It is well known that personal computers, work stations, and mainframe computers may be used to send electronic mail (e-mail) messages (e.g., in the form of ASCII text) to destination electronic mailboxes, often through service providers with access to the Internet, LAN (local area network), or other data network. Voice-mail messaging systems, much like answering machines, are also well known, wherein a telephone caller's spoken message is transmitted to a destination voice-mail mailbox where it is recorded for later playback by a designated recipient having access to the voice-mail mailbox.

In addition to conventional telephones connected to the public switched telephone network (PSTN), there also exist data network telephones wherein two (or more) users having personal computers (PCs) with microphones, speakers and sound conversion capabilities connect to each other through a data network and exchange electronic voice signals to be heard by the respective users. These telephones are often termed Internet phones or I-phone systems when the data network involved is the Internet, and users often access the Internet through Internet Service Providers (ISPs). One problem with data network telephones is that users must agree to be available to connect to each other simultaneously to hear the voice signals. One additional problem is the limitation of inadequate microprocessor processing power on many PCs in compressing real time voice signals for transmission over bandwidth limited networks such as the Internet.

One conventional solution to these problems is a voice electronic mail (voice e-mail) system which converts user voice signals into data to be transmitted in an e-mail message. Unfortunately, both this system and the data network telephone system require additional hardware that many PCs don't include and are otherwise inconvenient to transport, e.g., sound conversion and microphone capabilities. In addition, the playback of audio sounds on a PC speaker, especially a voice e-mail message, is often socially inappropriate in many quiet or public environments.

There is, therefore, a need in the industry for a system for addressing these and other related and unrelated problems.

SUMMARY OF THE INVENTION

The present invention includes a fully-functional wireless telephone which is additionally operable in a voice data interface mode in which voice data is output from the wireless telephone for communication over a data network, such as, for example, the Internet. Voice e-mail and data network telephone applications are two example implementations of the present invention. In the voice data interface mode, voice audio signals detected through a wireless telephone microphone are converted into data for transmission through the data network, and, likewise, voice data received by the wireless telephone from the data network is converted into audio signals and output through a wireless telephone speaker.

According to a first preferred embodiment of the present invention, a telecommunications system includes a wireless telephone with voice data interface functionality locally connected as a peripheral device to a PC. The connection between the wireless telephone and the PC is accomplished through, as one example, a serial input/output (I/O) port on the wireless telephone and a serial I/O port on the PC. Other embodiments include alternate ways of locally connecting the wireless telephone to the PC, including parallel connections or local wireless connections. In one implementation of either an Internet voice e-mail application or a data network telephone application, a user causes the wireless telephone to enter a voice data interface mode of operation and readies the PC to receive data through the serial I/O port connected to the wireless telephone. Once the wireless telephone is in the voice data interface mode, as the user speaks voice sounds into the wireless telephone, or subjects the wireless telephone to other sounds, the sounds are detected by the wireless telephone microphone and then digitized and compressed by the wireless telephone before being sent through the I/O port of the wireless telephone to the PC. In another implementation, such as for a voice e-mail application, the wireless telephone first stores voice data inside the wireless telephone until a transfer through the I/O port is possible. In such an implementation, the PC need not be ready to receive the data, and, furthermore, the wireless telephone need not even be connected to the PC when the user desires to record voice data.

When the PC receives the voice data, the data is transformed by the PC, as directed by the user, into, in the case of a voice e-mail application, a formatted text e-mail message, and a destination e-mail mailbox address selected by the user is attached to that formatted text e-mail message. The PC then conventionally transmits the e-mail message through the Internet to the destination e-mail mailbox using a connected PC modem communicating through a conventional land line telephone line with an Internet Service Provider (ISP). Likewise, when the user receives a e-mail message containing voice (sound) data (a voice e-mail message) after checking an e-mail mailbox, the user can direct the voice data to be serially output from the PC to the wireless telephone in the voice data interface mode where the voice data received by the wireless telephone is converted into audio signals and output through the wireless telephone speaker, in a private manner. Of course, in a data network telephone implementation, the wireless telephone serves as a private, effective and readily portable substitute for the microphone, speaker and sound conversion components of conventional data network telephone systems such that data is transferred, real-time, back and forth between the PC and the wireless telephone.

A second preferred embodiment of the present invention is similar to the first preferred embodiment except that the PC is not connected to a conventional land line telephone line which would otherwise provide a connection through the public switched telephone network (PSTN) to the data network, such as the Internet. Instead, the wireless telephone itself also provides a wireless link from the PC to the PSTN. According to this second embodiment, when the wireless telephone exits the voice data interface mode, it returns to function as a wireless telephone providing a wireless link to the PSTN for the connected PC. In other embodiments of the present invention, wireless telephones provide for more simultaneous operation in both the voice data interface mode and the conventional wireless telephone communication mode such that a real time wireless Internet telephone function is accomplished.

A third embodiment of the present invention is similar to the first embodiment of the present invention except that the wireless telephone wirelessly calls into the PC rather than being locally physically linked to the PC. One implementation of this embodiment includes a connection between a remote PC and the wireless telephone that extends through the PSTN, while other alternate implementations include a local wireless link. In the remote implementation, the PC acts as an intermediary by automatically accessing the ISP to communicate the voice data over the data network. In a store and forward application, such as a voice e-mail application, the PC only needs to include a single modem and a single telephone line connection, while in a real-time application, such as a data network telephone application, the PC needs to include multiple modem and land line connection functions.

A fourth preferred embodiment of the present invention includes a wireless telephone that also formats the voice data into a formatted text message and further provides the functionality provided by the PC in the first three preferred embodiments, i.e., the wireless telephone directly accesses the ISP through the PSTN. A recipient user's address (such as an e-mail mailbox for a voice e-mail implementation, and another type of address, i.e., a data network telephone "number", for a data network telephone implementation) is defined through manipulation of the wireless telephone keypad. Then, the wireless telephone directly accesses the ISP to upload and download voice data.

It is therefore an object of the present invention to eliminate the need for a personal computer microphone, speaker, and sound conversion functionality for voice communication over a data network by sharing these elements of a wireless telephone operable in a voice data interface mode.

Another object of the present invention is to leverage the inherent privacy and portability provided by a wireless telephone in the playback of audio data stored on a personal computer.

Another object of the present invention is to provide a wireless telephone voice data interface system.

Still another object of the present invention is to provide a wireless telephone having a voice data interface system for, in one embodiment, interfacing with a personal computer for sending and receiving voice data.

Yet another object of the present invention is to provide a wireless telephone operable in a voice data interface mode during which voice data is communicated, in one embodiment, through a serial input/output port on the wireless telephone.

Still another object of the present invention is to provide a wireless telephone operable in a voice data interface mode during which voice data is communicated, in one embodiment, directly with an ISP.

Yet another object of the present invention is to provide a personal computer peripheral including a microphone, a speaker, and voice conversion functionality which is further capable of wireless communication.

Other objects, features, and advantages of the present invention will become apparent upon reading and understanding the present specification, when taken in conjunction with accompanying drawings.

DETAILED DESCRIPTION OF THE PREFERRED EMBODIMENTS

Figure 1:
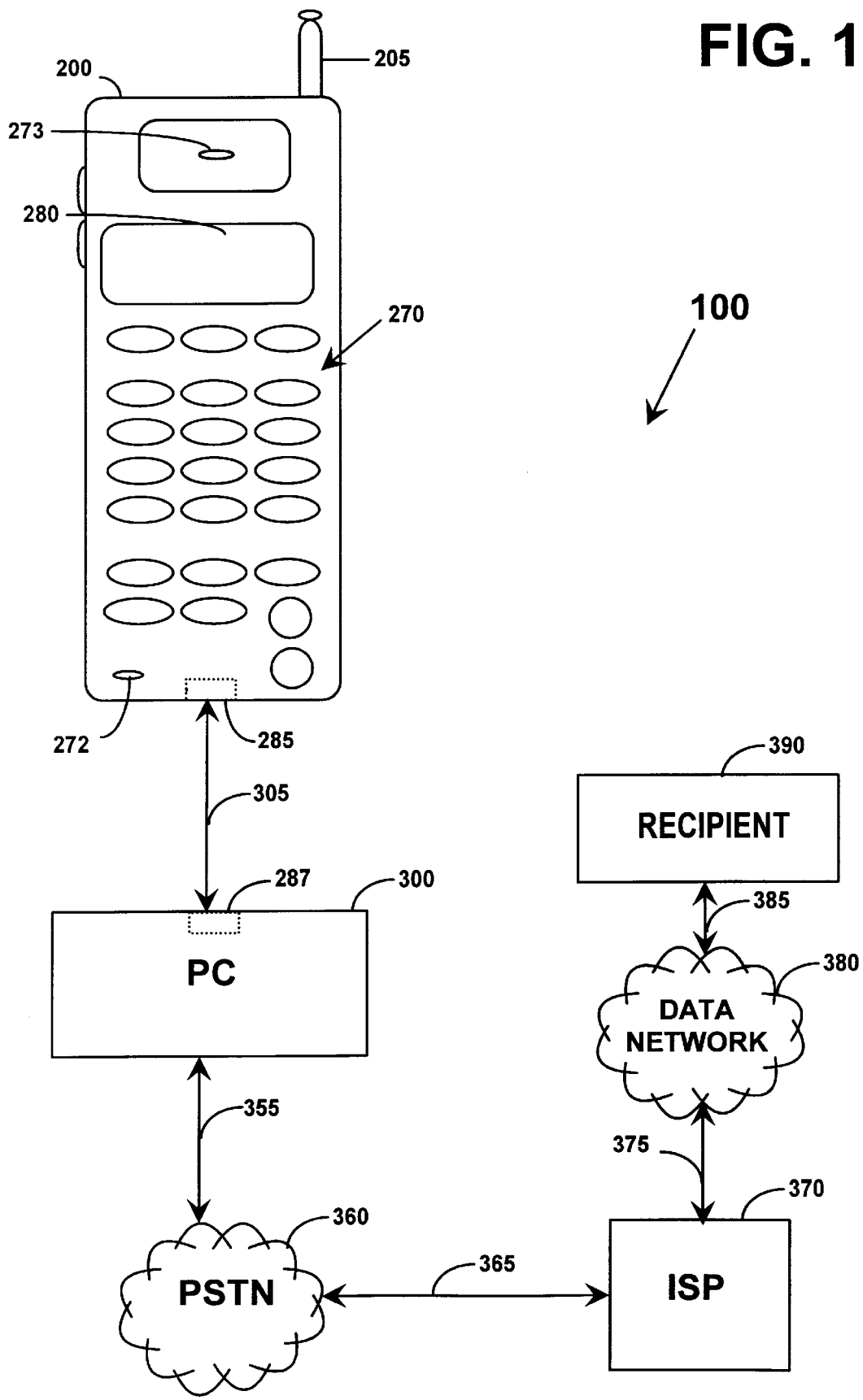
FIG. 1 is a block diagram representation of a telecommunications system including a wireless telephone with a voice data interface system connected to a PC as a peripheral device, in accordance with a first preferred embodiment of the present invention.

Reference is now made to the drawings, wherein like reference numerals designate corresponding parts throughout the several Figures. Referring now to FIG. 1, a block diagram representation of a telecommunications system 100 is shown, in accordance with a first preferred embodiments of the present invention. A wireless telephone 200 with a voice data interface system is shown physically connected as a peripheral device to a personal computer (PC) 300 through a peripheral line 305 connected to a PC input/output (I/O) port 287, such as a serial port. Wireless telephone 200 includes, at least, a retractable antenna 205, an alphanumeric display 280, a keypad 270 with a voice interface mode key 271, a microphone 272, a speaker 273, and an I/O port 285. Wireless telephone 200 also includes internal circuitry which will be discussed in more detail below with reference to FIG. 5. A public switched telephone network (PSTN) 360 is also connected to the PC 300 through a local loop line 355, thus the PC 300 is understood to include a conventional modem and communications software. An Internet service provider (ISP) 370, as one example of a data network entry point, is connected to the PSTN 360 through a network line 365. A data network 380, such as the Internet, is connected to the ISP 370 through network connection 375 and to a recipient 390 through a network connection 385. Examples of the recipient 390 include an e-mail mailbox or a data network telephone, such as an Internet telephone. Of course, as would be understood by those reasonably skilled in the art of the present invention, lines 355, 365, 375, and 385, are conventional telecommunication connections, thus including physical links and other types of standard links.

Figure 2:
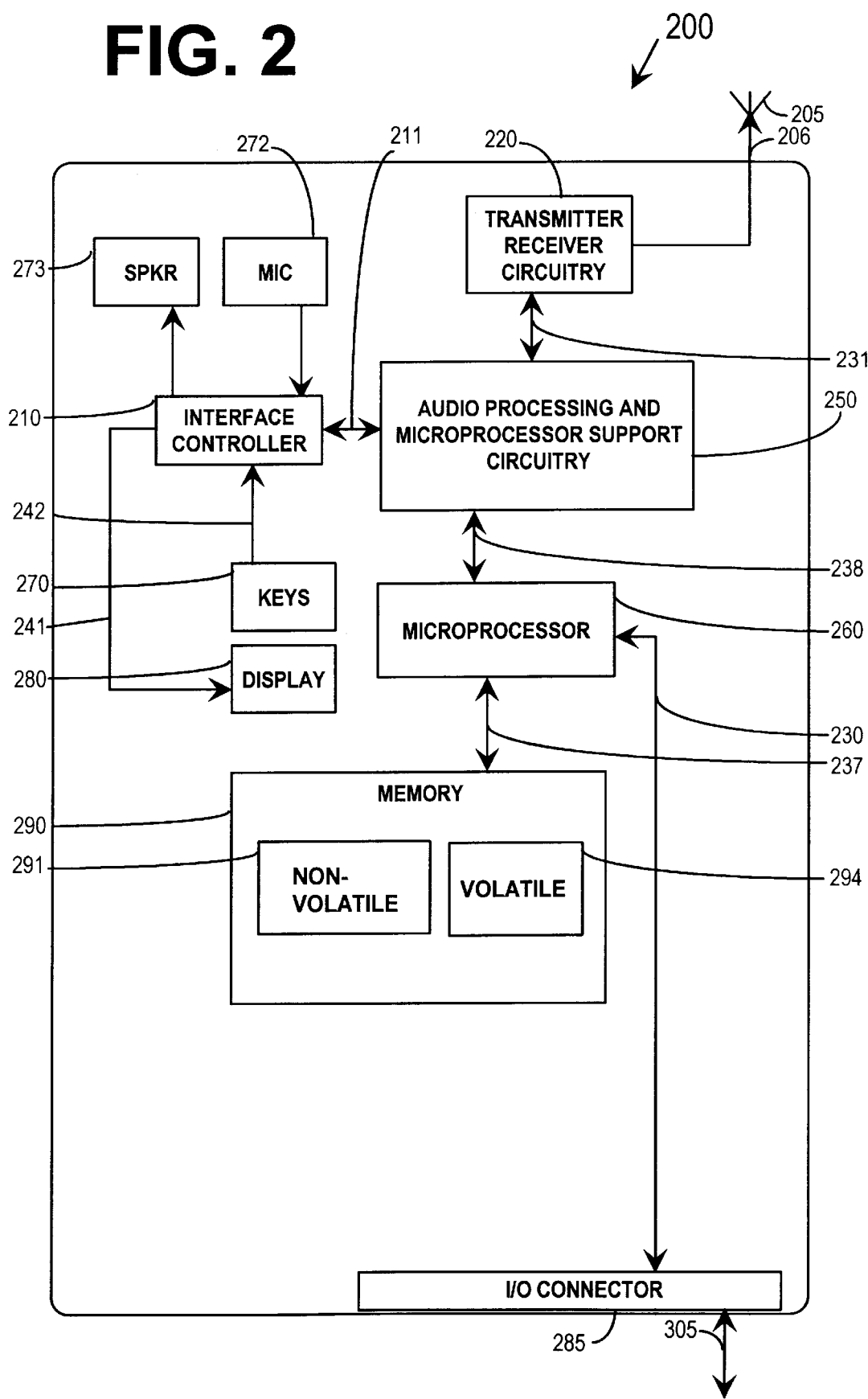
FIG. 2 is a block diagram representation of a telecommunications system including a wireless telephone with a voice data interface system connected to a PC as a peripheral device and as a wireless link to a PSTN, in accordance with a second preferred embodiment of the present invention.

FIG. 2 is a block diagram representation of the wireless telephone 200 with the voice data interface system, in accordance with the first preferred embodiment of the present invention. Modifications to the wireless telephone 200 that are necessary to accomplish other functions of the wireless telephones of other preferred embodiments of the present invention would be understood by those reasonably skilled in the art of the present invention after reading the discussion below. It should be understood that wireless telephone 200 is, in one implementation of the first preferred embodiment of the present invention, a code division multiple access (CDMA) digital cellular telephone. Of course, the scope of the present invention should be understood to include any type of wireless telephone, such as analog cellular telephones, time division multiple access (TDMA) digital telephones, 1.8 to 2.0 GHz personal communication systems (PCS), etc.

As voice signals, or other audio sounds, are received through the microphone 272, resulting analog signals are passed to an interface controller 210, which is connected through a connection 211 to audio processing and microprocessor support circuitry 250, which is connected to a microprocessor 260 through a connection 238. The speaker 273 is also connected to the interface controller 210, along with the keyboard 270 and display 280 through connections 242 and 241, respectively. Under direction from the microprocessor 260, as configured by memory 290, including both non-volatile memory 291 and volatile memory 294, circuitry 250 processes the microphone-received analog voice signals and includes, according to one implementation of the first preferred embodiment of the present invention, a coder/decoder (CODEC), a digital signal processor (DSP) functioning as a voice coder/decoder (VOCODER, or speech encoder/decoder), a CDMA modem, and an analog front end (AFE) for interfacing with transmitter receiver circuitry 220, which is connected to the antenna 205 through an antenna lead 206. The CODEC converts analog voice or speech (sound) signals to digital signals, for example, to pulse code modulated (PCM) digital signals. The DSP (VOCODER) receives the PCM speech samples and reduces the number of bits required to represent speech by exploiting the intrinsic properties of speech signals to reduce redundancy using a code excited linear prediction (CELP) method. On the receiver side, the DSP also performs Viterbi decoding for CDMA channel decoding.

While operating in a conventional transmission communication mode, the compressed signals from the VOCODER are convolutionally encoded for forward error correction, interleaved, CDMA channel encoded and converted to analog signals by the circuitry 250 prior to being mixed, filtered and modulated by transmitter receiver circuitry 220 and transmitted through antenna 205. When the wireless telephone 200 is operated in a voice data interface mode, after sounds are picked up by the microphone 272 and passed through the interface controller 210 to the circuitry 250, the detected sounds are digitized by the CODEC of circuitry 250 and then compressed by the VOCODER of circuitry 250 before being directed through the microprocessor 260 to external connector line 230, I/O connector 285, and peripheral line 305. According to alternate embodiments, forward error correction and error detection is also added. In the conventional reception communication mode of the first preferred embodiment of the present invention, received RF signals detected through antenna 205 follow a relatively similar, yet reversed, path to the speaker 273. Transmitter receiver circuitry 220 processes (demodulates, etc.) the received RF signals and passes the processed signals to the circuitry 250 for analog to digital conversion, CDMA channel decoding, de-interleaving, Viterbi decoded, etc.) before being sent to the DSP (VOCODER) and CODEC (not shown) of circuitry 250 for conversion to audio signals. On the other hand, while the portable wireless telephone 200 is operating in the voice data interface mode, vocoded digital sound signals received through the external connector line 230 are voice decoded and converted from digital to analog signals in the circuitry 250 before being output through the interface controller 210 and the speaker 273.

Of course, it should be understood that wireless telephone 200 also includes other components not specifically shown, such as a power manager which controls the supply of power and ground potential to various components and circuits of portable wireless telephone 200 such that separate types of power and grounding are available for digital circuits, analog and audio circuits, and RF circuits. A rechargeable battery is also included in wireless telephone 200 which supplies portable power to wireless telephone 200 and is recharged through a charge control circuit. In addition, a charging connector is also included for receiving charging current from a charging accessory, such as a wall mounted transformer in certain embodiments.

Now, referring to both FIGS. 1 and 2, regarding specific operation of the voice data interface mode of the wireless telephone 200 of the telecommunications system 100 of FIG. 1, in accordance with the first preferred embodiment of the present invention, a user invokes the voice data interface mode by pressing a predefined key sequence on the keypad 270 or by instructing the PC 300 to invoke the voice data interface mode in the wireless telephone 200. Of course, different alternate embodiments of the present invention include each of these methods in isolation, while others include a dedicated key on the keypad 270. According to the first preferred embodiment of the present invention, after confirmation handshaking between the PC 300 and the wireless telephone 200, the voice data interface mode is officially entered by the wireless telephone 200. However, the wireless telephone 200 is still available to receive incoming telephone calls, the detection of which will immediately end the voice data interface mode.

After entering the voice data interface mode, the if the users speaks, thus creating voice sounds, or subjects the wireless telephone 200 to another sound, the sound is detected by the microphone 272, and representative analog signals pass through the interface controller 210 before being converted to digitized sound by the CODEC and compressed by the VOCODER of circuitry 250. Subsequently, the digital signals are stored temporarily in volatile memory 294 of memory 290 before being output through I/O port 285. In alternate embodiments of the present invention, such storage lasts for as long as power is available to the wireless telephone so that such recorded sound can be output later. The format of the data leaving the I/O port 285 is, according to the first preferred embodiment of the present invention, ASCII text. Conversion to standard text format involves organizing bits of the stored compressed digitized sound in, for example, 7 bit ASCII character format with added bits (e.g., a parity bit, and start and stop bits) which are serially and asynchronously output through port 285 in conformance with the EIA/TIA 232-E standard. However, in other alternate embodiment systems, the compressed digitized data is sent instead as 8 bit binary data, i.e., as conventional data instead of, for example, 7 bit ASCII with added bits, or as a binary file attached to an e-mail message, as long as this data format is recognizable and retrievable in the alternate embodiment systems. Furthermore, basic PCM data and other formats are also contemplated.

After the PC 300 receives the data, according to the first preferred embodiment of the present invention, the compressed digitized data is transmitted from the PC 300, through the PSTN 360, ISP 370, and data network 380 to the recipient 390. In a voice Internet e-mail implementation, the compressed digitized data is included as text in a conventional e-mail message that is transmitted to a recipient e-mail address that is identified and designated by the PC 300 as directed by the user. On the receiving end, the recipient 390 is able to simply play the compressed digitized data of the voice e-mail message through a recipient PC (not shown) if capable of decompressing and converting the digitized signals into audio signals through a PC speaker; otherwise, a wireless telephone 200 receives the compressed digitized data and outputs the original sounds through the speaker 273 of the recipients wireless telephone 200 operating in the voice data interface mode. Similarly, in a data network telephone implementation, the compressed digitized data is forwarded to the recipient, as identified by the user during use of the PC 300, and similarly played back through a recipient PC or a recipient wireless telephone 200. Of course, rapid alternating between receiving and transmitting voice data is required of the wireless telephone 200.

Figure 3:
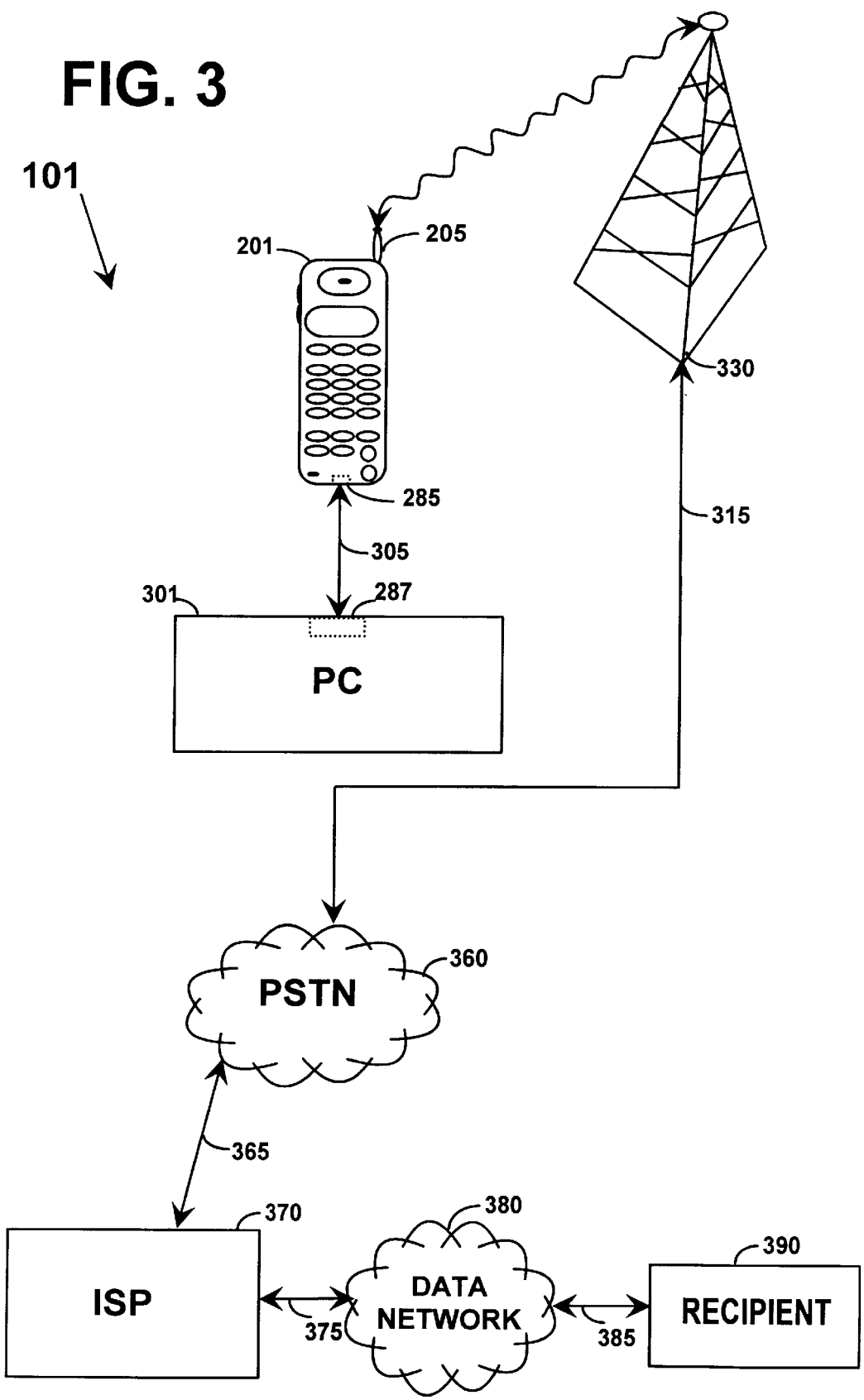
FIG. 3 is a block diagram representation of a telecommunications system including a wireless telephone with a voice data interface system wirelessly connected to a PSTN for connection to a PC, which in turn connects to an ISP, in accordance with a third preferred embodiment of the present invention.

FIG. 3 is a block diagram representation of a telecommunications system 101 including a wireless telephone 201 with a voice data interface system connected to a PC 301 as a peripheral device and as a wireless link to the PSTN 360 through a base station 330 and a network connection 315, in accordance with a second preferred embodiment of the present invention. As with the telecommunication system 100 (FIG. 1) of the first preferred embodiment of the present invention, an ISP 370 is connected through network line 365 to the PSTN 360 and through a network line 375 to a data network 380, which is connected through a network line 385 to a recipient 390. However, in addition to functioning as a voice data input and output peripheral for PC 301, wireless telephone 201, base station 330, and network connection 315 take the place of local loop line 355 of FIG. 1. Accordingly, in a voice e-mail implementation, after a user utilizes the wireless telephone 201 to generate a voice e-mail message in the PC 301, the wireless telephone 201 returns to operate in a conventional transmission communication mode so that PC 301 is able to access the ISP 370 through an initial wireless link provided by the wireless telephone 201. In one such embodiment, the PC 301 provides modem functionality and merely transmits regular modulated audio signals through the wireless telephone 201, while in other embodiments, the wireless telephone 201 provides the modem functionality so that the PC 301 simply transmits serial data through the connector 305, seeing the wireless telephone 201 as a modem. In a data network telephone implementation, the wireless telephone 201 is required to quickly alternate between data interface and conventional communication modes, as well as between transmit and receive modes.

Figure 4:
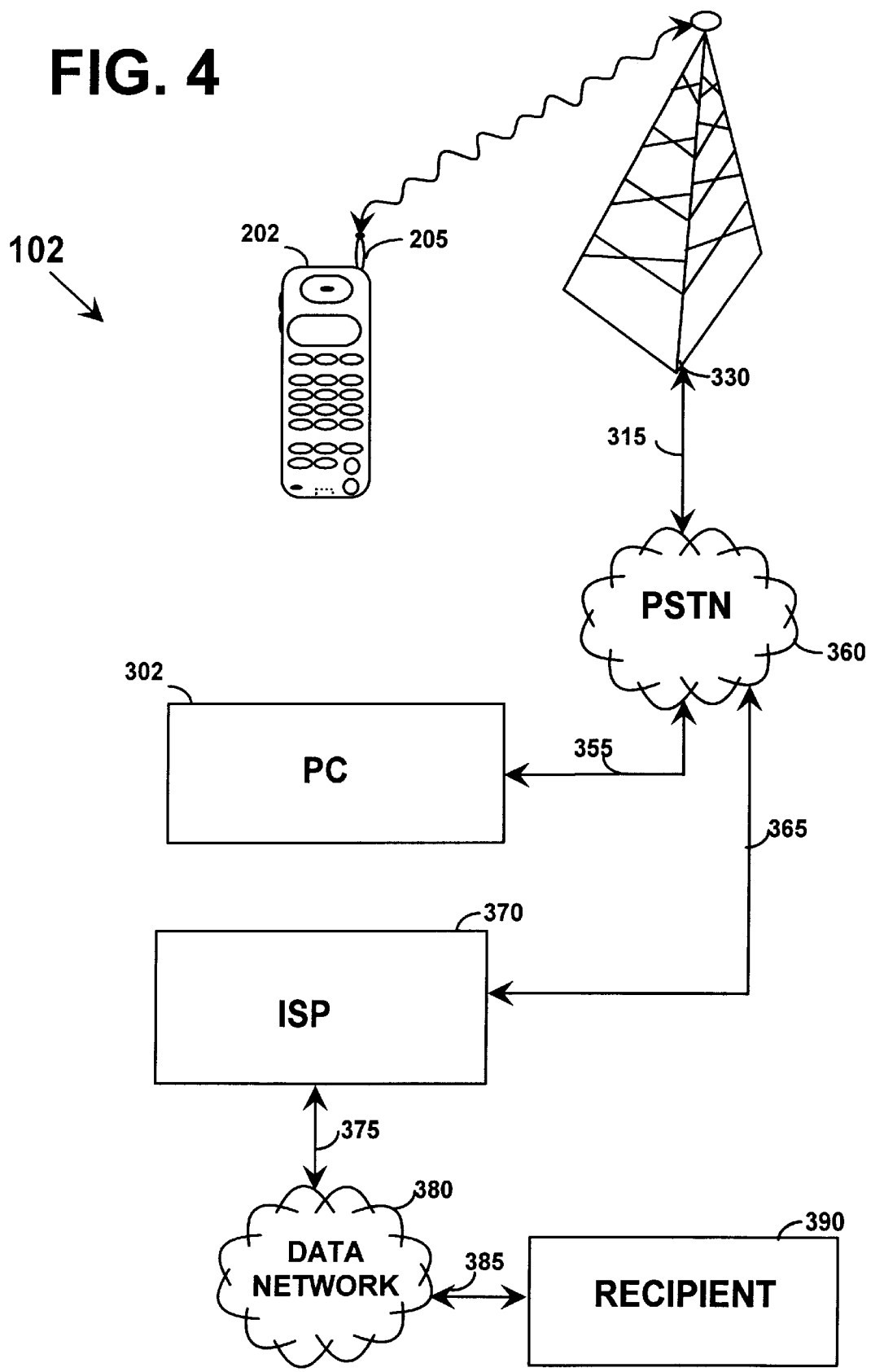
FIG. 4 is a block diagram representation of a telecommunications system including a wireless telephone with a voice data interface system wirelessly connected to a PSTN for direct connection to an ISP, in accordance with a fourth preferred embodiment of the present invention.

FIG. 4 is a block diagram representation of a telecommunications system 102 including a wireless telephone 202 with a voice data interface system wirelessly connected to the PSTN 360 for connection to a PC 302, which in turn connects through the PSTN 360 to the ISP 370, in accordance with a third preferred embodiment of the present invention. Once again the base station 330 and network connection 315 provide a connection to the PSTN 360, and the ISP 370 is connected through network line 365 to the PSTN 360 and through a network line 375 to a data network 380, which is connected through a network line 385 to a recipient 390. According to this embodiment, the voice data interface mode is invoked after the wireless telephone 202 establishes a connection with the PC 302 by calling into the PC 302 and beginning data communications with the PC 302, which is thus required to be running auto-answer communication software capable of communicating with the PC 302. After the voice data interface mode is entered, voice data is received by the PC 302 (or transmitted from the PC 302 to the wireless telephone 202 if previously received). The PC 302 then automatically accesses the ISP 370 to communicate the voice data over the data network 380. In a store and forward application, such as a voice e-mail application, the PC 302 only needs to include a single modem and a single telephone line connection, while in a real-time application, such as a data network telephone application, the PC 302 needs to include multiple modem and land line connection functions. The user manipulates the wireless telephone 202 to establish the identity of the recipient 390, which is also communicated to the PC 302. According to one implementation, alphanumeric addresses are stored in the wireless telephone 202, whereas other embodiments include simply designating one of a plurality of addresses stored in the PC 302. Of course, conventional e-mail broadcasting, responding and forwarding are also available.

Figure 5:
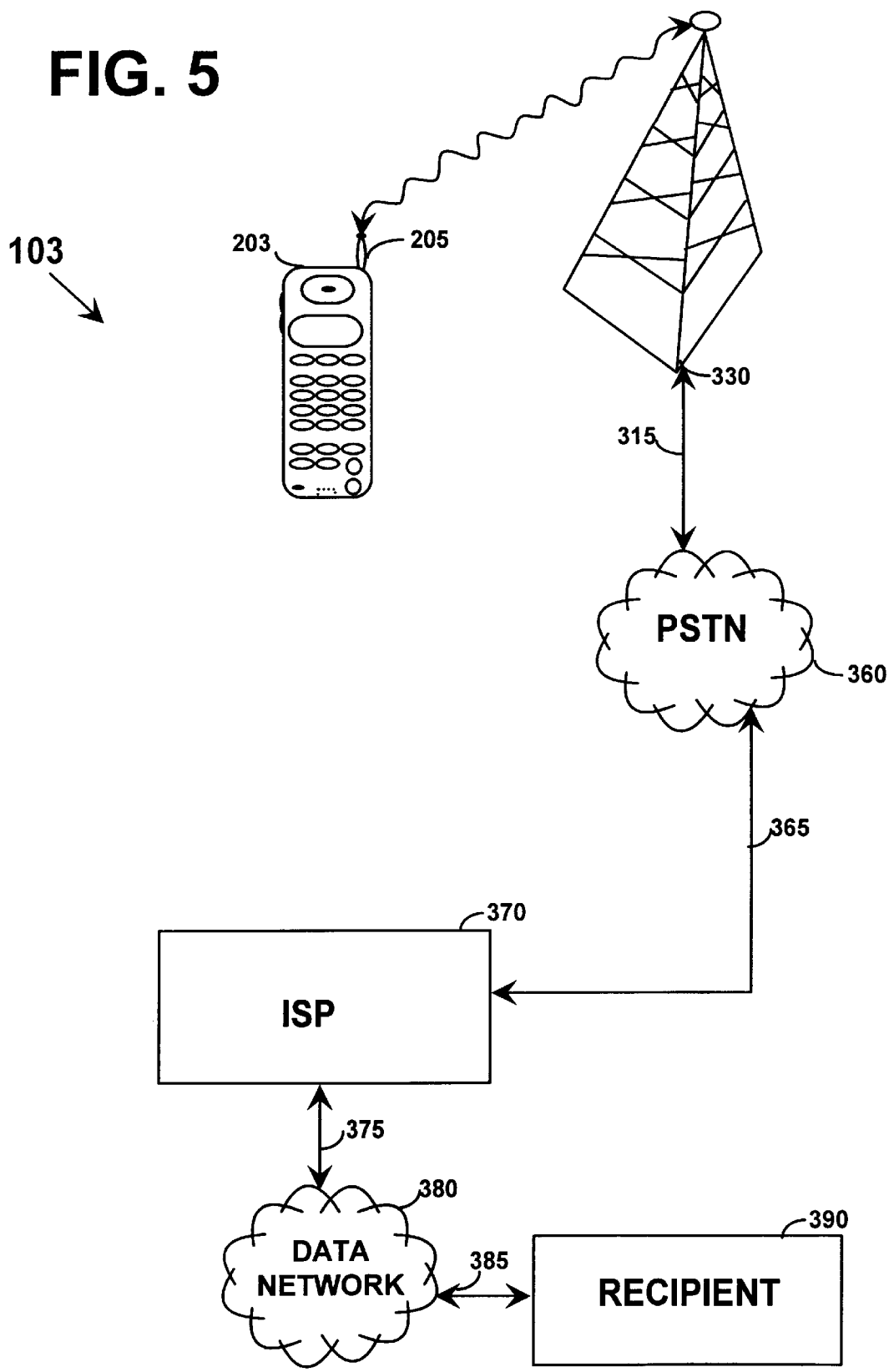
FIG. 5 is a block diagram representation of a wireless telephone with a voice data interface system of preferred embodiments of the present invention.

FIG. 5 shows a block diagram representation of a telecommunications system 103 including a wireless telephone 203 with a voice data interface system wirelessly connected through the base station 330 and network connection 315 to the PSTN 360 and network connection 365 for direct (not through a PC) connection to the ISP 370, in accordance with a fourth preferred embodiment of the present invention. In this embodiment, functionality of PC 302 (FIG. 4) has, conceptually, been moved into the wireless telephone 203 or, in other embodiments, into the ISP 370. Accordingly, after entering the voice data interface mode, the wireless telephone 203 communicates directly with the ISP 370 to identify the recipient 390 and transmit compressed digitized data.

It is intended that the scope of the present invention also include various other embodiments besides those already described. Accordingly, it should be understood that each of the embodiments disclosed herein, including all the preferred embodiments, include features and characteristics which are considered independently inventive. Thus, the disclosure of variations and alterations of the preferred embodiments are intended only to reflect on the breath of the scope of the present invention without suggesting that any of the specific features and characteristics of the preferred embodiments are more obvious or less important.

Regarding specific application to the many inventive aspects of the present invention, a variety of environmental, economic, and other considerations are understood to contribute to the alteration or omission of selected inventive aspects. For example, although I/O port 285 conforms to the EIA/TIA-232-E standard, I/O port 285 may be a port with a bare minimum of control, signal, and communication lines (pins), as dictated by size and weight requirements of wireless telephone 200. Also, in certain embodiments it may be better in some circumstances to send voice e-mail messages as binary files attached to e-mail messages (created in PC 300) to e-mail mailboxes accepting voice e-mail messages.

The present invention is also useful in applications unrelated to communicating with a recipient. For environments or mechanical arrangements where playback through a PC speaker or recording with a PC microphone is unavailable or discouraged, a wireless telephone can be used as a peripheral for basic sound input and output functionality. Of course, in addition to or, in other embodiments, in the place of compressed digitized signals, depending on the type and purpose of the data being communicated, audio signals or PCM signals, are communicated through the I/O connector of the wireless telephone. In addition, besides communication through a data network accessible through the PSTN, use in other data networks is also contemplated, such as a local area network.

While the embodiments of the present invention which have been disclosed herein are the preferred forms, other embodiments of the present invention will suggest themselves to persons skilled in the art in view of the disclosure. Therefore it will be understood that variations and modifications can be effected within the spirit and scope of the invention and that the scope of the present invention should only be limited by the claims below. Furthermore, the corresponding structures, materials, acts, and equivalents of any means- or step-plus-function elements in the claims below are defined to include any structure, material, or acts for performing the functions in combination with other claimed elements as specifically claimed.

I claim:

1. A method of sending a voice electronic mail message to an electronic mailbox, the method comprising steps of:

coupling a wireless telephone to a personal computer;

detecting sounds through a microphone of the wireless telephone;

digitizing the detected sounds in the wireless telephone;

communicating the digitized detected sounds from the wireless telephone to the personal computer;

assembling in the personal computer the digitized detected sounds into an electronic mail message with an associated recipient electronic mailbox address; and sending the electronic mail message to the recipient electronic mailbox.

2. The method as claimed in claim 1, further comprising a step of compressing the digitized detected sounds before being assembled in the electronic mail message.

3. The method as claimed in claim 1, wherein said sending step includes sending the electronic mail message to an Internet recipient electronic mailbox.

4. The method as claimed in claim 1, wherein said assembling step is accomplished by the wireless telephone and further includes a step of defining the recipient electronic mailbox address through manipulation of a keypad on the wireless telephone.

5. The method as claimed in claim 1, wherein said coupling step includes coupling through a local physical connection.

6. The method as claimed in claim 5, wherein said local physical connection includes a serial connection.

7. The method as claimed in claim 1, wherein said coupling step includes coupling through a local wireless connection.

8. The method as claimed in claim 1, wherein said coupling step includes coupling through a public switched telephone network.

9. The method as claimed in claim 1, wherein said sending step includes communicating from the personal computer, through the wireless telephone, to a public switched telephone network.

10. The method as claimed in claim 1, wherein said sending step includes communicating from the personal computer, directly through a land line connection, to a public switched telephone network.

\* \* \* \* \*